(12) United States Patent
Wachs et al.

(10) Patent No.: US 11,598,628 B1
(45) Date of Patent: Mar. 7, 2023

(54) HIGH DYNAMIC RANGE PICOMETER METROLOGY SYSTEMS AND METHODS

(71) Applicant: Ball Aerospace & Technologies Corp., Boulder, CO (US)

(72) Inventors: Jordan Wachs, Lafayette, CO (US); James Leitch, Boulder, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 1302 days.

(21) Appl. No.: 16/008,652

(22) Filed: Jun. 14, 2018

Related U.S. Application Data (60) Provisional application No. 62/520,304, filed on Jun. 15, 2017.

(51) Int. Cl.
| | |
|---|---|
| *G01B 9/02001* | (2022.01) |
| *G01B 9/02015* | (2022.01) |
| *G01B 9/02004* | (2022.01) |

(52) U.S. Cl.
CPC ..... *G01B 9/02008* (2013.01); *G01B 9/02004* (2013.01); *G01B 9/02028* (2013.01)

(58) Field of Classification Search
CPC ......................... G01B 9/02004; G01B 9/02008
See application file for complete search history.

(56) References Cited

U.S. PATENT DOCUMENTS

| | | | |
|---|---|---|---|
| 7,636,166 B2 | 12/2009 | De Groot et al. | |
| 8,860,949 B2 | 10/2014 | Ishizuka et al. | |
| 9,797,705 B2 | 10/2017 | Chen et al. | |
| 9,879,979 B2 | 1/2018 | Zhang et al. | |
| 9,885,556 B2 | 2/2018 | Zhu et al. | |
| 9,903,704 B2 | 2/2018 | Zhu et al. | |
| 2010/0026983 A1* | 2/2010 | Kawasaki | G01B 9/02069 356/3 |
| 2013/0003038 A1* | 1/2013 | Tachizaki | G01B 9/02008 356/5.11 |
| 2013/0222785 A1* | 8/2013 | Sasaki | G01B 9/02008 356/4.09 |
| 2016/0123720 A1* | 5/2016 | Thorpe | G01B 9/02004 356/498 |
| 2018/0045500 A1* | 2/2018 | Chen | G01B 9/02005 |

OTHER PUBLICATIONS

"Optical Frequency Combs," National Institute of Standards and Technology, created Dec. 31, 2009, updated Mar. 16, 2018, 6 pages [retrieved online from www.nist.gov/topics/physics/optical-frequency-combs].

(Continued)

*Primary Examiner* — Michael A Lyons
(74) *Attorney, Agent, or Firm* — Sheridan Ross P.C.

(57) ABSTRACT

Systems and methods for measuring displacements at the picometer level are provided. A system can include a Michelson interferometer having a fixed arm and a measurement arm. As the length of the measurement arm changes, the output supplied to the interferometer from a variable wavelength light source is changed until the intensity of the resulting inference pattern is maximized. The wavelength of the light at the point the interference pattern is maximized is then measured by mixing light from the light source with the output from a frequency comb generator. The resulting frequency measurement is then converted to a length measurement.

16 Claims, 7 Drawing Sheets

(56) References Cited

OTHER PUBLICATIONS

Schibli et al. "Displacement metrology with sub-pm resolution in air based on a fs-comb wavelength synthesizer," Optics Express, Jun. 2006, vol. 14, No. 13, 5989, 10 pages.
Wachs "Frequency Comb Development for Ultra-Precise Space Based Applications," Ball Aerospace & Technologies Corp., Mar. 27, 2017, 22 pages.
Wachs "Frequency Comb Development for Ultra-Precise Space Based Applications," 33rd Space Symposium, Technical Track, Colorado Springs, Colorado, United States of America, Apr. 3-6, 2017, 13 pages.

* cited by examiner

FIG.8

HIGH DYNAMIC RANGE PICOMETER METROLOGY SYSTEMS AND METHODS

CROSS-REFERENCE TO RELATED APPLICATIONS

This application claims the benefit of U.S. Provisional Patent Application Ser. No. 62/520,304, filed Jun. 15, 2017, the entire disclosure of which is hereby incorporated herein by reference.

FIELD

The present disclosure provides systems and methods for measuring small displacements.

BACKGROUND

Precise measurements are important for ensuring accurate control and high levels of performance in many systems. For example, precision optical systems, such as telescopes, can require the precise alignment of mirrors in order to function properly. For instance, systems such as the James Webb Space Telescope incorporate relatively large reflectors that are formed from a number of mirror segments. These segments must be held in precise alignment relative to each other, so that they function as a single mirror. In addition, the location of the elements relative to the other elements of the optical train must be maintained with high levels of precision.

The ability to maintain the required alignment using a static structure is not feasible, for example because of the significant mass and size limitations of a system that is deployed in space, such as the James Webb Space Telescope, and because of the thermal and other loads that act on the elements and the supporting structure. Accordingly, the elements of such instruments have been mounted on actuators that allow minute changes to the relative positions of the elements to be adjusted. This in turn requires the ability to measure the actual location of the elements with high levels of precision, so that appropriate adjustments can be made.

In order to make suitably precise measurements, interferometers have been used. However, the measurement dynamic range of such instruments has been very small. For example, the measurement of distance or displacement using a Michelson interferometer involves splitting light having a fixed wavelength into a reference beam and a measurement beam. The measurement beam is reflected from the surface of the mirror segment being measured, and is recombined with the reference beams. The fringe pattern that results from the interference is then analyzed. In particular, changes in the distance traversed by the light in the measurement arm of the interferometer results in changes in the amplitude of the interference pattern that can be measured at a detector. In the James Webb Space Telescope, such techniques allow measurements of as small as about 1nm to be made. However, future telescopes will require even greater precision.

As an alternative to Michelson interferometers, researchers at various institutions have used frequency combs to monitor Fabry Perot resonances to achieve sub picometer displacement measurements. However, these instruments also have very small dynamic ranges. In addition, this configuration requires a resonant cavity (Fabry Perot) which is significantly more sensitive to alignment than the Michelson interferometer. Other groups (for instance those at the National Institute of Standards) have demonstrated high precision displacement measurements using multiple frequency comb signals. In these systems, measurements of displacement are derived from pulsed time of flight rather than through the use of an interferometer.

SUMMARY

The present disclosure is directed to solving these and other problems and disadvantages of the prior art. The disclosed systems and methods provide a light based metrology system capable of making picometer scale displacement measurements with a high dynamic range (e.g. on the order of $10^9$). More particularly, embodiments of the present disclosure utilize a variable wavelength light source in combination with a fixed or known reference frequency or set of reference frequencies to measure small displacements.

Systems in accordance with embodiments of the present disclosure include a Michelson interferometer, with a variable length measurement arm and a fixed length reference arm. A variable wavelength light source is configured to supply light to the interferometer. A first photodetector is positioned to receive an interference pattern produced in the interferometer, and is operable to output an intensity signal and/or a frequency signal. Light from the variable wavelength light source is also supplied to an optical combiner, where it is mixed with light from a reference frequency generator. In accordance with at least some embodiments of the present disclosure, the reference frequency generator is a frequency comb. The resulting heterodyne signal is received at a second photodetector, which outputs a frequency signal. A processor can be provided as part of or separate from the optical elements to convert the frequency signal to a displacement measurement.

Methods in accordance with embodiments of the present disclosure include supplying light from a variable wavelength light source to an interferometer having a variable length measurement arm and a fixed length reference arm. In response to changes in the length of the measurement arm, the wavelength of light supplied from the variable wavelength light source is adjusted, to one of maximize or minimize an intensity of an interference pattern produced by the interferometer. The light from the variable wavelength light source is also mixed with light having a known wavelength. The heterodyne frequency produced by mixing the light from the light source with the light of the reference wavelength is measured, and that measurement is then converted to a displacement measurement. In accordance with at least some embodiments of the present disclosure, the reference wavelength is produced by a frequency comb generator, which outputs a set or comb of different known frequencies (or wavelengths).

Additional features and advantages of embodiments of the disclosed systems and methods will become more readily apparent from the following description, particularly when taken together with the accompanying drawings.

DETAILED DESCRIPTION

Figure 1:
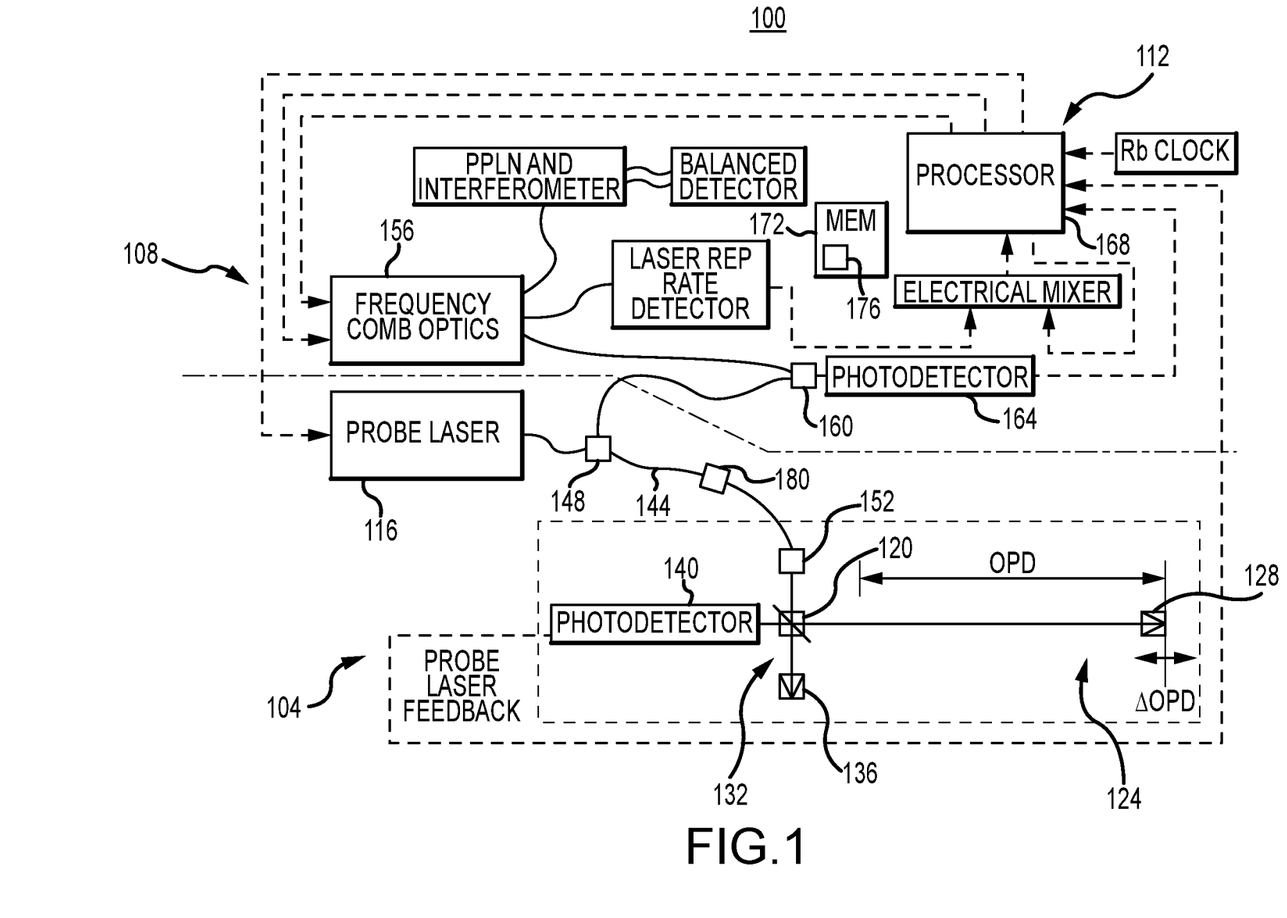
FIG. 1 is a block diagram depicting a metrology system in accordance with embodiments of the present disclosure.

FIG. 1 is a block diagram depicting a metrology system 100 in accordance with embodiments of the present disclosure. The system includes an interferometer 104, a reference wavelength generator 108, and control electronics 112.

The interferometer 104 is generally configured as an unequal length Michelson Interferometer, and includes a variable wavelength probe laser or light source 116, a beam splitter/combiner 120, a measurement arm 124, a measurement arm mirror 128, a reference arm 132, a reference arm mirror 136, and a first photodetector 140. Light from the variable wavelength light source 116 is delivered as collimated light to the beam splitter/combiner 120. In accordance with at least some embodiments of the present disclosure, a first portion of the light output by the light source 116 is delivered to the beam splitter/combiner by an optical fiber 144 via a beam splitter 148. Moreover, one or more optical elements, such as a collimator 152, can be provided between the output of the light source 116 and the beam splitter/combiner 120.

The beam splitter/combiner 120 directs a first portion of the light received from the variable wavelength light source 116 along the first or measurement arm 124, and directs a second portion of the light received from the variable wavelength light source 116 along the second or reference arm 132. Light directed along the measurement arm 124 is reflected back to the beam splitter combiner 120 by the measurement arm mirror 128, and the light directed along the reference arm 132 is reflected back to the beam splitter/combiner 120 by the reference arm mirror 136. In accordance with at least some embodiments of the present disclosure, the measurement arm mirror 128 is fixed to a component of a device associated with a length that is being measured. In accordance with further embodiments of the present disclosure, the measurement arm mirror 128 may also be implemented as a functional component of the device, such as a primary mirror of a telescope. One or both of the measurement arm mirror 128 and the reference arm mirror 136 may be configured as a retroreflector.

The interference signal generated at the beam splitter/combiner 120 by the light reflected back along the arms 124 and 132 of the interferometer 104 is detected at the first photodetector 140. As can be appreciated by one of skill in the art after consideration of the present disclosure, as the optical path length difference (OPD) between the length of the measurement arm 124 and the length of the reference arm 132, and/or the wavelength of the light output by the light source 116, is changed, the interference pattern produced at the beam splitter/combiner 120 is likewise changed. In particular, the intensity of the combined light varies in a sine-wave pattern. In accordance with embodiments of the present disclosure, and as discussed in greater detail elsewhere herein, the wavelength of the light output by the light source 116 is varied in response to changes in the length of the measurement arm 124 in order to maintain a constant intensity at the first photodetector 140.

In accordance with at least some embodiments of the present disclosure, the reference wavelength generator 108 comprises a frequency comb generator 156. As a particular example, the frequency comb generator 156 may comprise an all-fiber, semiconductor saturable absorber mirror (SESAM) mode-locked comb. In an exemplary configuration, the frequency comb generator 156 allows use of 10 nm of spectrum when the comb is fully locked, or full use of the spectrum between 1 µm and 2 µm if self-referencing is not necessary. In accordance with still other embodiments, a full octave of spectrum can be used while the comb is fully locked. As can be appreciated by one of skill in the art, the optical frequency comb spectrum of a frequency comb generator is the frequency-domain picture of an ultra-short pulse. In the time domain, the pulse appears as a pulsed signal from a femtosecond laser (e.g. a having a pulse duration of 40-48 fs). In the frequency domain, the pulse is comprised of individual comb lines, that are spaced evenly across the pulse spectrum. All of the comb lines are simultaneously present and in-phase during the pulse, and interfere destructively outside the pulse.

The output of the reference wavelength generator 108 is provided to a first input of an optical combiner 160, and the beam splitter 148 directs a second portion of the light output from the light source 116 to a second input of the optical combiner 160. The combining or mixing of the output from the reference wavelength generator 108 with the output from the light source 116 produces a heterodyne signal that is passed to a second photodetector 164. The output of the second photodetector 164 is a frequency signal that is passed to the control electronics 112.

The control electronics 112 generally include a processor 168 and memory 172. Integral to or provided separately from the processor 168 are inputs/outputs to receive signals from various components of the metrology system 100, and to output control and measurement signals. The processor 168 can comprise a general purpose programmable processor, application specific integrated circuit (ASIC), computer, field programmable gate array (FPGA), controller, or other device or element that is generally capable of executing instructions or code. Moreover, such instructions and code can be stored as software or firmware, in the memory 172 or on the processor 168 itself. In this example, application software 176 for controlling at least some aspects of the operation of the metrology system is shown as being stored in the memory 172. The memory 172 can comprise a solid-state memory, such as but not limited to DRAM or SDRAM, or any other memory device suitable for the short and/or long term storage of instructions, data, or the like in connection with the operation of the system 100, including the operation of the processor 168.

Inputs to the processor 168 can include an intensity signal and/or a frequency signal provided by the first photodetector 140, and a frequency signal provided by the second photodetector 164. Control signals output from the processor 168 can include a wavelength control signal to the light source 116, and a signal to control the operation of the frequency comb generator 156.

Figure 2:
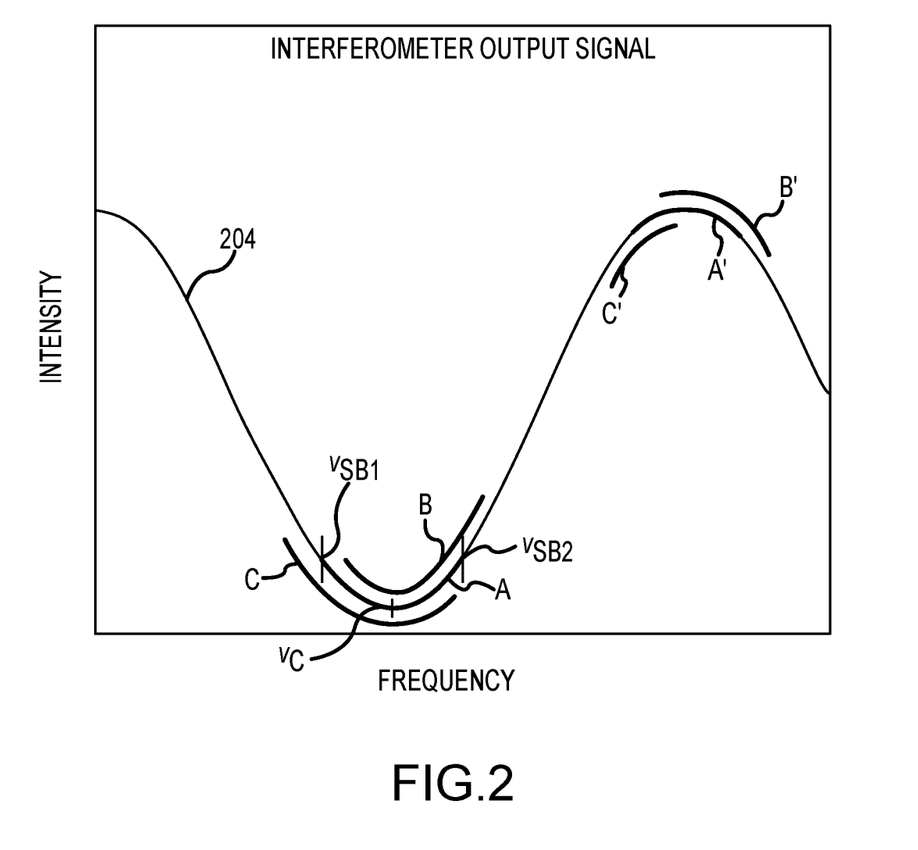
FIG. 2 depicts an interferometer output signal in accordance with embodiments of the present disclosure.

In accordance with at least some embodiments of the present disclosure, the variable wavelength light source 116 is configured to output light within at least a selected range of frequencies. For a given measurement arm 124 length, the intensity of the interference signal output by the interferometer 104 varies as the wavelength of the light supplied by the light source 116 is varied. Similarly, as the light output by the light source 116 is held constant, the intensity of the interference signal output by the interferometer varies as the length of the measurement arm 124 changes. This is depicted in FIG. 2, in which the signal received at the first photodetector 140 is represented by plot 204. In particular, the intensity of the interference signal varies from zero to a maximum amount in a sine-wave pattern.

In accordance with at least some embodiments of the present disclosure, the light output by the light source 116 can be modulated by a modulator 180, such as an electro-optic modulator, before the light is passed to the beam splitter/combiner 120 of the interferometer 104. The modulator 180 generates sidebands of frequencies $v_{SB1}$ and $v_{SB2}$ on either side of the light or carrier frequency $v_c$ (i.e. on the output of the light source 116) that is supplied to the interferometer. Accordingly, the output signal can extend over a range of frequencies centered on the light source 116 output frequency $v_c$, and between the sideband frequencies $v_{SB1}$ and $v_{SB2}$. In the example of FIG. 2, from the null A, where the signal strength is a minimum, a change in the wavelength (or carrier frequency) of the light provided from the light source 116 increases the strength of the signal in either a first direction to B, or in a second direction to C, depending on the sign of the displacement. In accordance with other embodiments of the present disclosure, the constant intensity sought to be maintained by the metrology system 100 can be a maximum intensity A', in which case the wavelength of the light output by the light source 116 is varied to drive the intensity back from B' or C' to the maximum value A'. By changing the wavelength of the probe laser 116, the intensity of the signal at the photodetector 140 in the interferometer 104 can be driven to zero (or to the maximum), so that no fringe hopping occurs.

Figure 3A:
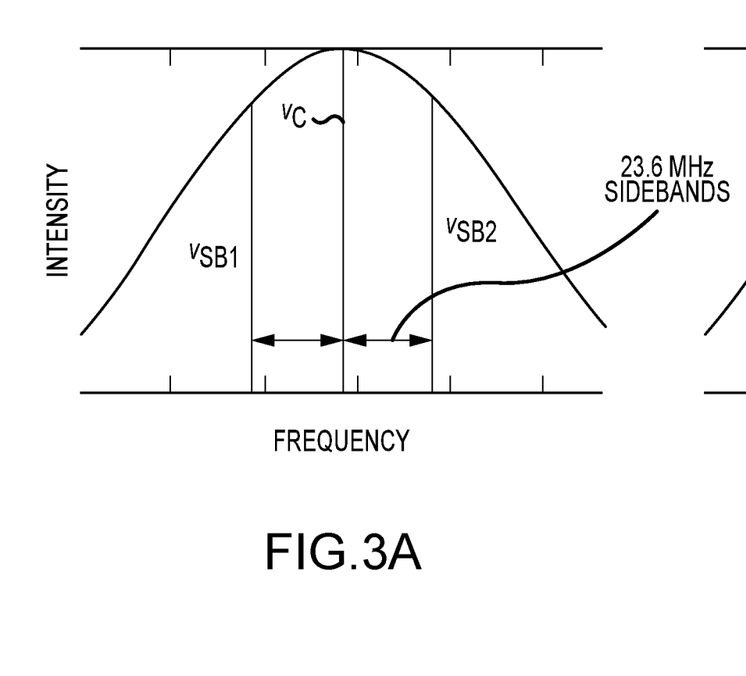
FIGS. 3A-3B depict interferometer output signals in accordance with further embodiments of the present disclosure.
Figure 3B:
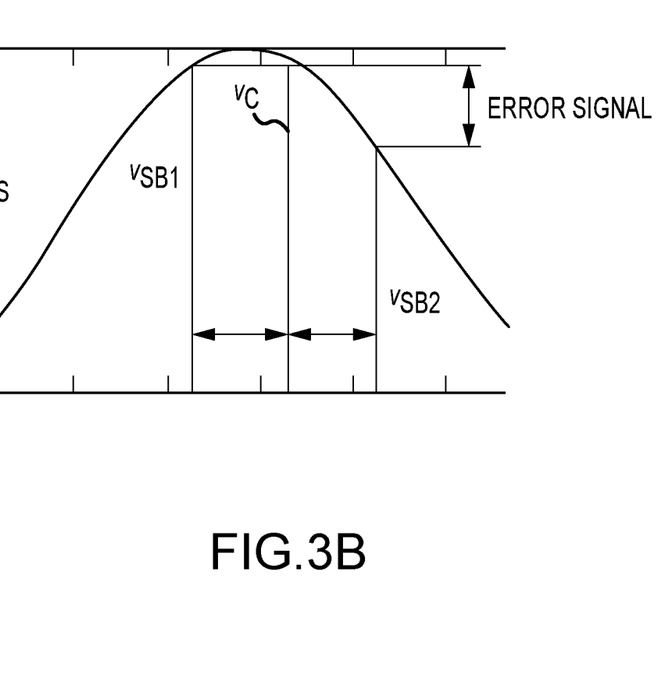

In accordance with at least some embodiments of the present disclosure, the first photodetector 140 can provide an output that includes a frequency signal (see FIG. 3A). The frequency signal from the first photodetector 140 can be mixed with the modulated output from the light source 116. When the carrier frequency $v_c$ is exactly on resonance, the symmetry of the interferometer 104 response causes destructive interference between the two carrier sideband heterodyne signals present in the signal from the photodetector 140 and the modulated signal from the light source 116. The frequency signal from the first photodetector 140 can thus be used to determine when the output of the light source 116 is on resonance relative to the interferometer 104 (i.e. when it is at a maximum). In addition, as shown in FIG. 3B, a difference in sideband intensity and the opposite phase of the sidebands allows the control electronics 112 to determine from the mixed signal when $v_{SB1}$ or $v_{SB2}$ dominates, which in turn determines the direction in which to move the wavelength of the light output by the light source 116 (i.e. the carrier frequency $v_c$). Accordingly, embodiments of the present disclosure can implement the Pound-Drever-Hall (PDH) method for locking a wavelength to an optical cavity, in which the wavelength (or frequency) of the light output by the light source is controlled to achieve maximum intensity at the output of the interferometer 104, as measured at the photodetector 140. In addition use of this technique allows the control electronics 112 to discern the direction in which the wavelength of the light source 116 needs to be moved, in order to reach the maximum intensity.

As can be appreciated by one of skill in the art after consideration of the present disclosure, at resonance the wavelength of the light supplied to the interferometer 104 by the light source 116 is an integer multiple of the optical path difference (OPD) of the interferometer 104 between the measurement arm 124 and the reference arm 132 of the interferometer 104. This can in turn be applied in determining the optical path difference, or a change in the optical path difference, at a very high level of precision (e.g. at a tens of picometers or even a picometer level). In accordance with embodiments of the present disclosure, the heterodyne signal produced by mixing the light output by the light source 116 with the light output by the reference wavelength generator 108 is used to measure changes in the wavelength (or frequency) of the light from the light source 116, for use in calculating changes in the length of the optical path difference. Moreover, at least some embodiments implement the reference wavelength generator 108 as a frequency comb generator 156.

Figure 4:
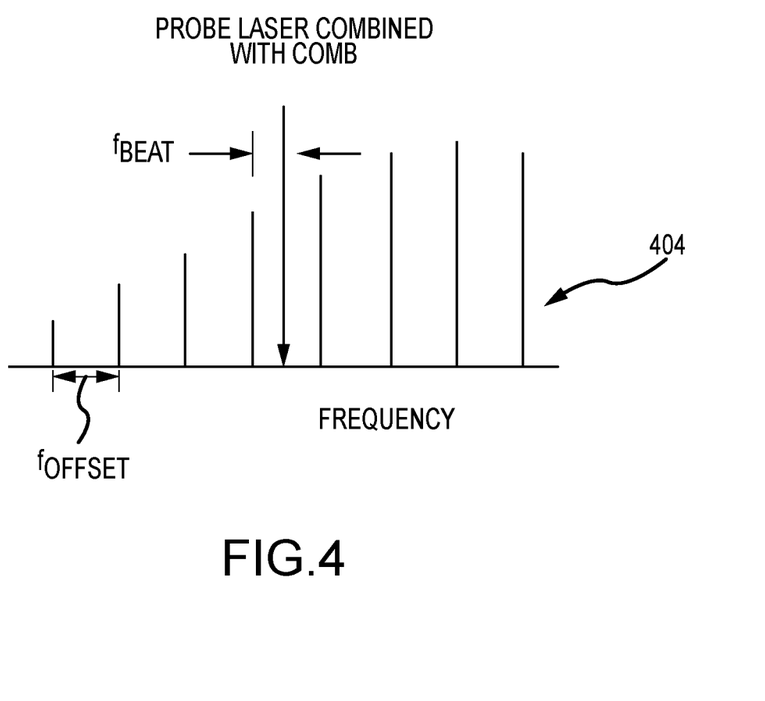
FIG. 4 depicts an example output of a frequency comb generator and of a light source in accordance with embodiments of the present disclosure.
Figure 5:
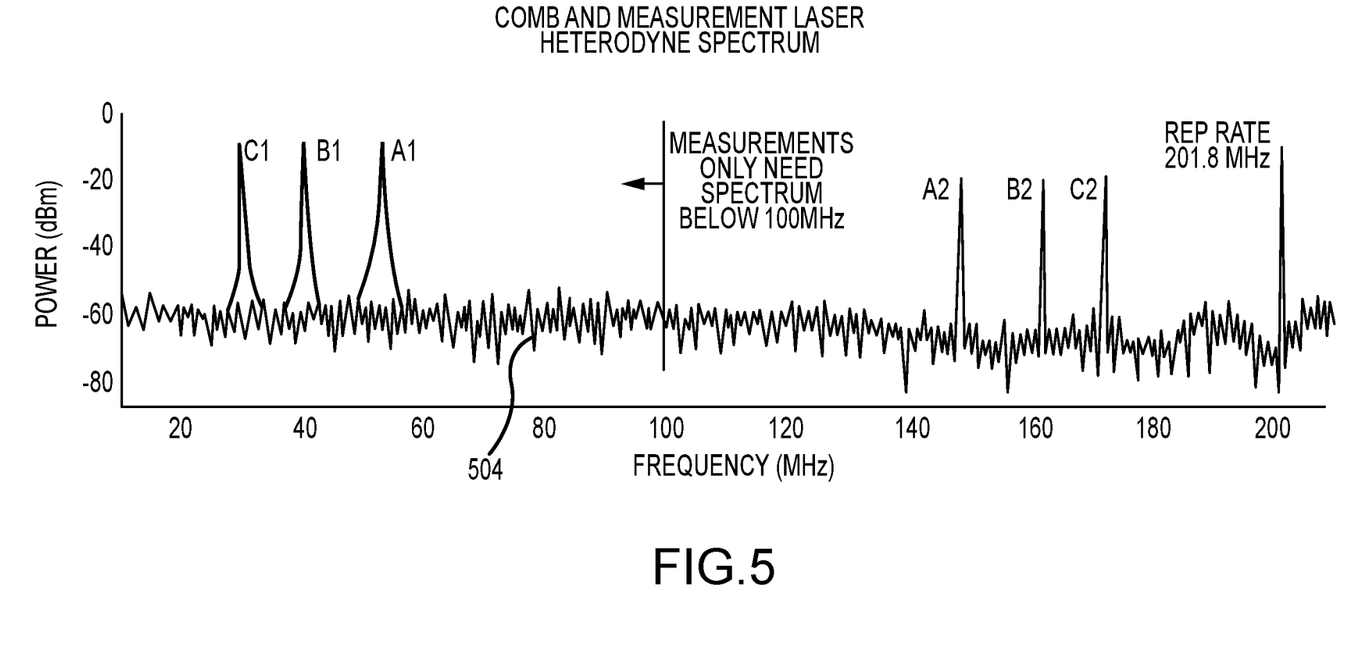
FIG. 5 depicts an example heterodyne spectrum in accordance with embodiments of the present disclosure.

As illustrated in FIG. 4, a reference wavelength generator 108 implemented as a frequency comb generator 156 produces a series or set of frequencies 404 that are equally spaced from one another by an offset amount $f_{offset}$. As an example, the offset amount may be 200 MHz. The frequency comb generator is controlled so that it outputs frequencies over a range that encompasses an output frequency of the light source 116. FIG. 5 illustrates a raw heterodyne signal 504 as detected at the second photodetector 164. As can be appreciated by one of skill in the art, the heterodyne signal can be filtered, so that only one heterodyne signal from the pair of heterodyne beat signals produced with the outputs from the light source 116 and reference frequency generator 108 are mixed. In this example, the mixing of three example wavelengths of light from the light source 116 are depicted, A1, B1, and C1, with the length of the measurement arm 124 increasing as the signal moves from A1 to C1.

Figure 6:
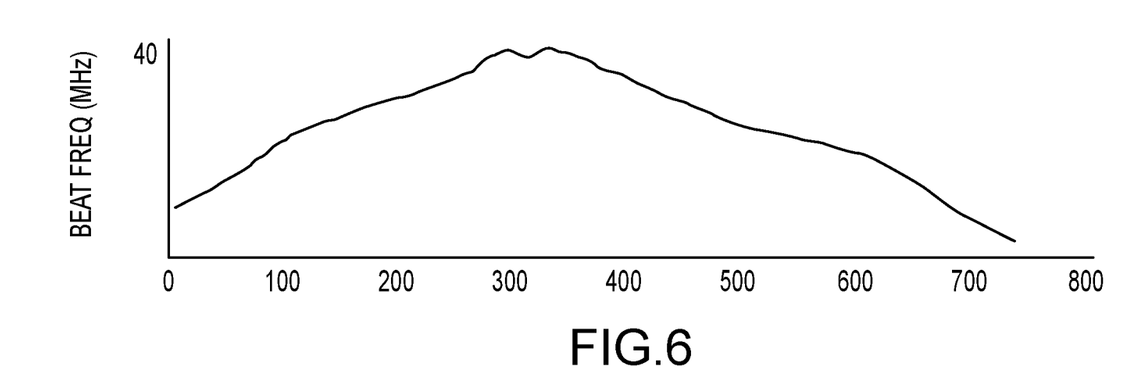
FIG. 6 depicts an example heterodyne measurement in accordance with embodiments of the present disclosure.
Figure 7:
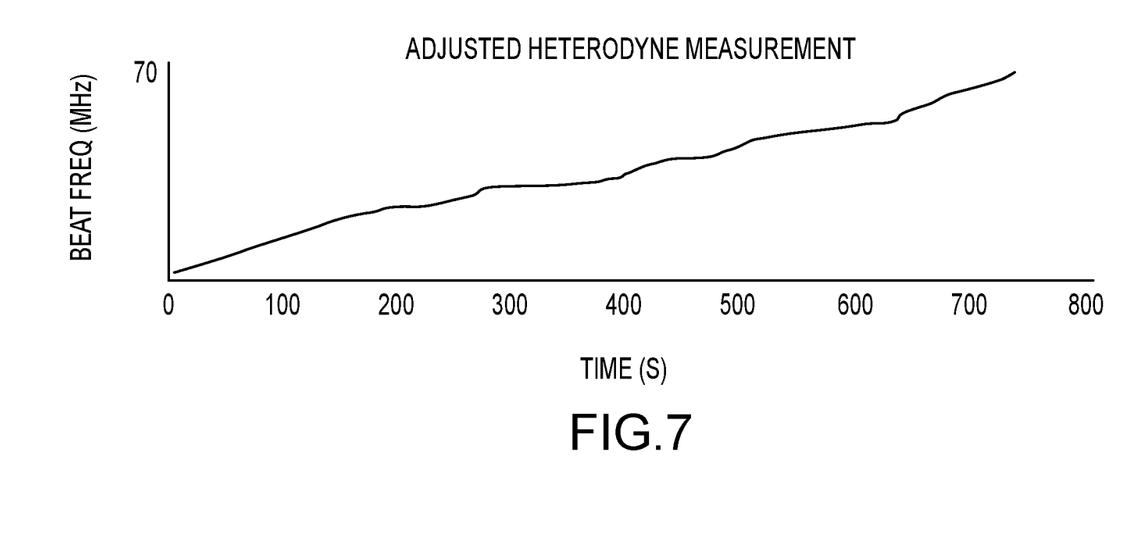
FIG. 7 depicts an example adjusted heterodyne measurement in accordance with embodiments of the present disclosure.

With reference now to FIG. 6, the adjusted heterodyne measurement as the output of the light source is varied relative to two adjacent teeth of the output of the frequency comb generator 156 is depicted. In FIG. 7, the data from FIG. 6 is shown with an adjustment to account for the interference of the output frequencies of the repetitive comb spectrum falling on either side of the frequency of the light from the light source 116.

Figure 8:
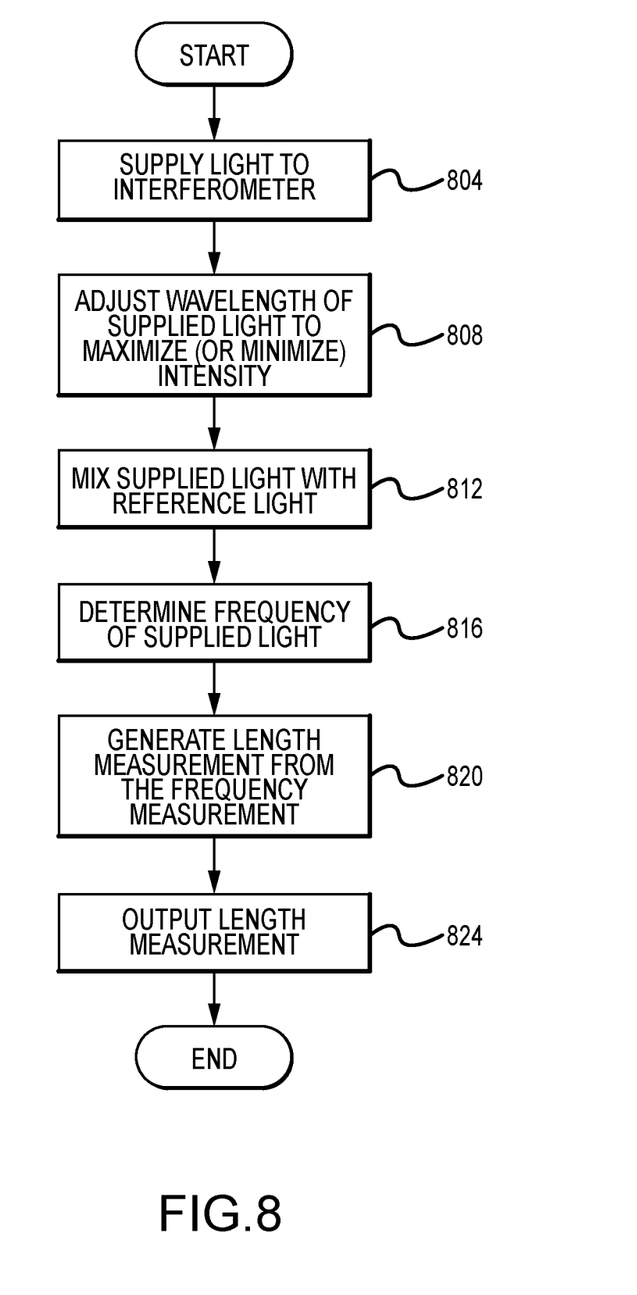
FIG. 8 depicts aspects of a method for measuring small displacements in accordance with embodiments of the present disclosure.

Aspects of a method of measuring small displacements in accordance with embodiments of the present disclosure are illustrated in FIG. 8. Initially, at step 804, light is provided from a variable wavelength light source 116 to an interferometer 104 having a measurement arm 124 and a reference arm 132. The measurement arm 124 includes a mirror or reflector 128 that is attached to an object associated with a length to be measured. The interference signal resulting from the combining of the light from the two arms 124 and 132 of the interferometer 104 is provided to a photodetector 140. The wavelength of the light from the light source 116 is then dithered to find the wavelength at which the intensity of the interference signal received at the photodetector 140 is minimized or maximized (step 808).

The intensity or amplitude of the interference signal received at the first photodetector 140 varies between zero and a maximum in a sine wave pattern as the measurement arm 124 changes length. This is depicted in FIG. 2, which shows a plot 204 of the intensity of the output or interference signal from the interferometer 104, as detected at the first photodetector 140. As shown, from the null A, where the signal strength is a minimum, a change in the wavelength of the light provided from the light source 116 increases the strength of the signal in either a first direction to B, or in a second direction to C, depending on the sign of the displacement. In accordance with other embodiments of the present disclosure, the constant intensity sought to be maintained by the metrology system 100 can be a maximum intensity A', in which case the wavelength of the light output by the light source 116 is varied to drive the intensity back from B' or C' to the maximum value A'. By changing the wavelength of the probe laser 116, the intensity of the signal at the photodetector 140 in the interferometer 104 can be driven to zero (or to the maximum), so that no fringe hopping occurs. In accordance with further embodiments, the output of the light source 116 can be modulated so as to include sidebands that can be used in an implementation of the PDH method to facilitate locking the wavelength of that output light to the optical cavity length to maximize the intensity of the interference signal. This is depicted in FIGS. 3A-3B.

With the wavelength (or frequency) of the light from the light source 116 now adjusted to a value that results in a maximum (or minimum) detected intensity at the photodetector 140, the light from the light source 116 is mixed with the output of a reference frequency generator 108, producing a heterodyne signal (step 812). The frequency of the heterodyne signal is then determined (step 816). For example, the heterodyne signal can be provided to a frequency counting photodetector 164.

Next, the length of the measurement arm 124 can be determined (step 820). Measurement arm 124 length can be related to wavelength to by the following equation:

$$\lambda = \frac{c}{f} = x = \frac{zmeas - zref}{n + 1/2}$$

Where zmeas is the length of the measurement arm 124, zref is the length of the reference arm 132, and n is the number of wavelengths of the light source 116 that fit in the OPD. In accordance with embodiments of the present disclosure, the length measured by the metrology system 100 is the deviation of the measurement arm 124 length from a nominal length. The system 100 can then output the deviation of the length of the measurement arm 124 from the nominal length, or can convert that value to an absolute length (step 824). The process can then end.

Accordingly, it can be appreciated that operation of the metrology system 100 differs from that of the most common use scenario for a Michelson interferometer. In particular, rather than observing fringe behavior for a fixed wavelength probe laser and calculating displacement based on fringe intensity variations, embodiments of the present disclosure change the wavelength of the probe laser 116 in order to maintain a constant maximum (or alternatively a constant minimum) interference pattern intensity. This allows the center wavelength of the probe laser 116 to become the measured quantity, allowing the system 100 to use the stable, broadband output of the frequency comb generator 156 or other reference wavelength generator 108 as a reference for precise, high dynamic range, measurement of the probe laser 116 wavelength. Because changes in the length of the reference arm 124 are directly related to changes in the probe laser 116 frequency, it is possible to utilize the comb spectrum as a "ruler" to detect changes in the measurement arm 124 length. The heterodyne output from mixing the probe laser 116 output with the frequency comb spectrum shows a beat frequency that rises and falls as the probe laser 116 wavelength moves relative to the stable teeth.

Accordingly, the metrology system 100 uses frequency modulated light to sense a fringe intensity maximum or minimum, leading to a high accuracy frequency lock to the desired fringe feature. To unambiguously measure the fringe phase, the local shape of the interferometer fringe is measured by looking at both sides of the maximum or minimum fringe intensity. To do this in the frequency modulated laser metrology gauge, the frequency of the laser light can be modulated or dithered slightly ($\Delta\gamma/\upsilon \sim 10^{-6}$) about its nominal frequency. The observed intensity for a system frequency modulated about a maximum or a minimum intensity fringe gives an intensity pattern with a frequency twice that of the modulated rate. If the optical path length difference between the two arms 124, 132 changes, the frequency at which the null occurs will move. The amplitude and phase of the resulting if component indicate the direction and amount of change in interferometer 104 arm lengths.

The fringe phase information can be used in a feedback system with the if signal serving as an error signal to drive the laser center frequency to stay on a null fringe of the interferometer. Using a tunable probe laser 116, displacements of the measurement arm 124 of the interferometer 104 can be tracked with high accuracy by monitoring the frequency of the probe laser. Where $I_{bkgd}$ is assumed to be zero, and $I = I_{det}/I_{fringe}$, the change in the optical path length, which is the change in the difference between the lengths of the two arms 124, 132 of the interferometer 104, can be interpreted as: $\Delta OPL = (\Delta\lambda \cos^{-1}(\sqrt{1}))/2\pi n$. Readout of this type of system can be carried out by heterodyning the probe laser against a stabilized reference beam, allowing the direct measurement of the beat frequency to determine $\Delta\lambda$. This approach, while very powerful, is also inherently limited by detector bandwidth. Use of the laser frequency comb as a reference, however, means that the lowest detected heterodyne frequency will never exceed half of the repetition rate of the comb, thereby greatly extending the dynamic range. Furthermore, the broadband coherent nature of a frequency comb allows the measurement of the probe laser 116 frequency to be made over a range spanning more than an octave of optical bandwidth, while only requiring a modest detector bandwidth (on the order of 100 MHz), without sacrificing measurement accuracy.

In accordance with embodiments of the present disclosure, the center wavelength of the probe laser 116 is mixed with a frequency comb spectrum from the output of the frequency generator 156, to allow tracking of wavelength changes across very wide ranges. The graphs shown in FIGS. 4-6 depict data demonstrating the ability of a metrology system 100 incorporating a frequency comb generator 156 as described herein to track the change of the wavelength of the light source 116. More particularly, FIG. 4 shows the output of the frequency comb generator 156. FIG. 5 shows a raw heterodyne signal as the wavelength changes relative to the frequency comb. The measurement arm can be seen to be growing in length as the signal moves from A1 to C1. The graph shown in FIG. 6 depicts the peak of the heterodyne signal tracked with measurement arm displacement. The graph shown in FIG. 7 depicts the heterodyne signal adjusted for the repetitive comb spectrum.

Accordingly, embodiments of the present disclosure provide a metrology system incorporating a Michelson interferometer 104 and a frequency comb generator 156. The interferometer 104 is used to express picometer scale displacements in terms of wavelength, while the frequency comb output by the frequency comb generator is used to measure that wavelength. Embodiments of a metrology system 100 as disclosed herein can be applied to any device, instrument, or measurement scenario in which a precise displacement or length measurement is desired.

The foregoing description has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A system, comprising:
   a laser light source, wherein a wavelength of light output by the laser light source is variable;
   an interferometer, including:
      a first arm having a variable length;
      a second arm having a fixed length; and
      a first photodetector, wherein light output by the laser light source and passed along the first and second arms is combined and directed to the first photodetector, and wherein the first photodetector is operable to output at least one of an intensity and a frequency signal;
   a frequency comb generator, wherein an output of the frequency comb generator includes light at a plurality of different wavelengths; and
   a second photodetector, wherein the light output by the laser light source and light output by the frequency comb generator is combined and directed to the second photodetector, wherein the second photodetector is operable to output a frequency signal, wherein with an intensity of light detected by the first photodetector is one of minimized or maximized with the wavelength of light output by the laser light source at a first wavelength, wherein the plurality of different wavelengths of light output by the frequency comb generator include a first comb wavelength and a second comb wavelength, and wherein the first wavelength is between the first comb wavelength and the second comb wavelength.

2. The system of claim 1, wherein an end of the first arm of the interferometer is fixed to a component of a measured system.

3. A metrology system, comprising:
   a variable wavelength light source;
   an optical splitter, wherein an output of the variable wavelength light source is connected to an input of the optical splitter, and wherein the optical splitter has first and second outputs;
   an interferometer, including:
      a beam splitter, wherein an input of the beam splitter is connected to the first output of the optical splitter;
      a first arm having a first reflective element at a first distance from the beam splitter, wherein the first distance is variable, wherein the beam splitter is operable to direct a first portion of light received from the variable wavelength light source via the optical splitter and the beam splitter along the first arm, and wherein the first reflective element is operable to reflect light back to the beam splitter;
      a second arm having a second reflective element at a second distance from the beam splitter, wherein the beam splitter is operable to direct a second portion of the light received from the variable wavelength light source via the optical splitter and the beam splitter along the second arm, and wherein the second reflective element is operable to reflect light back to the beam splitter;
      a first photodetector, wherein light received at the beam splitter from the first and second reflective elements of the first and second arms is combined at the beam splitter and is directed to the first photodetector;
   a frequency comb generator;
   an optical combiner, wherein a first input to the optical combiner is operatively connected to the second output of the optical splitter, and wherein a second input to the optical combiner is connected to an output of the frequency comb generator;
   a second photodetector, wherein the second photodetector receives a combined signal including light output by the variable wavelength light source and light output by the frequency comb generator from the optical combiner; and
   an electro-optic modulator, wherein the output from the variable wavelength light source is modulated by a frequency produced by the electro-optic modulator to create a modulated signal having first and second sidebands, wherein the modulated signal is provided to the input of the beam splitter, and wherein the output of the variable wavelength light source is controlled to maximize an intensity of a signal received at the first photodetector.

4. The system of claim 3, wherein the first photodetector detects an intensity of light, and wherein the second photodetector detects a frequency of light.

5. The system of claim 3, wherein the first distance of the first reflective element from the beam splitter is varied by varying a length of the first arm of the interferometer.

6. The system of claim 5, wherein the first reflective element of the first arm of the interferometer is one of attached to a component of a measured system or part of a measured system.

7. The system of claim 3, further comprising:
   a measurement signal line, wherein the measurement signal line carries a frequency signal from the second photodetector.

8. The system of claim 3, further comprising:
   a feedback signal line, wherein the feedback signal line carries an intensity signal from the first photodetector.

9. The system of claim 8, further comprising:
   a controller, wherein the controller receives as an input the signal from the first photodetector carried by the feedback signal line, wherein the controller is operable to provide a control signal to the variable wavelength light source to control a wavelength of light produced by the variable wavelength light source.

10. The system of claim 9, wherein the controller receives as an input a frequency signal from the second photodetector.

11. The system of claim 10, wherein the controller is operable to convert the frequency signal to a distance.

12. A method for measuring a displacement, comprising:
   passing light along first and second arms of an interferometer;
   adjusting a wavelength of the light passed along the first and second arms of the interferometer to one of maximize or minimize an intensity of an interference signal generated by the interferometer;

mixing the light at the wavelength at which the intensity of the interference signal is one of maximized or minimized with an output from a reference frequency generator to produce a heterodyne signal;

measuring a frequency of the heterodyne signal; and converting the measured frequency to a displacement measurement.

13. The method of claim 12, wherein the displacement measurement is a measurement of a length of the first arm of the interferometer.

14. The method of claim 12, further comprising:

in response to a change in a length of the first arm of the interferometer, detecting a change in the intensity of the interference signal; and changing the wavelength of the light passed along the first and second arms of the interferometer to the one of maximize or minimize an intensity of the interference signal.

15. The method of claim 12, wherein the reference frequency generator is a frequency comb generator that outputs light at a plurality of different wavelengths, wherein each of the different wavelengths is separated from at least one adjacent wavelength by 200 MHz.

16. The method of claim 12, wherein the wavelength of the light passed along the first and second arms of the interferometer is adjusted to maximize an intensity of the interference signal.

* * * * *